US008340731B2

United States Patent
Kroll et al.

(10) Patent No.: US 8,340,731 B2
(45) Date of Patent: *Dec. 25, 2012

(54) AUTOMATIC RECHARGING WIRELESS HEADSET

(76) Inventors: Braden Kroll, Minneapolis, MN (US); Mark W. Kroll, Crystal Bay, MN (US)

(*) Notice: Subject to any disclaimer, the term of this patent is extended or adjusted under 35 U.S.C. 154(b) by 0 days.

This patent is subject to a terminal disclaimer.

(21) Appl. No.: 13/312,023

(22) Filed: Dec. 6, 2011

(65) Prior Publication Data

US 2012/0077553 A1    Mar. 29, 2012

Related U.S. Application Data

(63) Continuation of application No. 12/033,366, filed on Feb. 19, 2008, now Pat. No. 8,160,655.

(51) Int. Cl.
*H04M 1/00* (2006.01)
*H04B 1/38* (2006.01)

(52) U.S. Cl. ............... 455/573; 455/572; 455/575.2; 455/343.1; 455/343.6; 320/101; 320/114; 320/123; 320/137; 320/138

(58) Field of Classification Search .......... 455/572–574, 455/343.1–343.6, 575.2; 320/101, 114, 116, 320/117, 121, 123, 137, 138
See application file for complete search history.

(56) References Cited

U.S. PATENT DOCUMENTS

| | | | |
|---|---|---|---|
| 5,818,946 A | 10/1998 | Walter | |
| 5,945,749 A | 8/1999 | Li | |
| 5,994,871 A | 11/1999 | Stove | |
| 6,037,743 A | 3/2000 | White et al. | |
| 6,473,630 B1* | 10/2002 | Baranowski et al. | 455/572 |
| 6,762,926 B1 | 7/2004 | Shiue et al. | |
| 6,984,902 B1 | 1/2006 | Huang et al. | |
| 7,009,315 B2 | 3/2006 | Takeuchi | |
| 7,265,037 B2 | 9/2007 | Yang et al. | |
| 7,268,517 B2* | 9/2007 | Rahmel et al. | 320/101 |
| 7,292,823 B2 | 11/2007 | Kuo | |
| 7,431,450 B2* | 10/2008 | Huang | 351/103 |
| 7,646,863 B2* | 1/2010 | Johnston | 379/430 |
| 2006/0025074 A1 | 2/2006 | Liang et al. | |
| 2007/0054706 A1 | 3/2007 | Liu | |
| 2007/0072649 A1 | 3/2007 | Park | |
| 2007/0099568 A1 | 5/2007 | Yang et al. | |
| 2007/0194634 A1 | 8/2007 | Roberts | |
| 2007/0210580 A1 | 9/2007 | Roberts et al. | |
| 2007/0248238 A1 | 10/2007 | Abreu | |
| 2008/0080705 A1 | 4/2008 | Gerhardt et al. | |

(Continued)

OTHER PUBLICATIONS

"Energy Scavenging for Mobile and Wireless Electronics," IEEE CS and IEEE ComSoc, 1536-1268/05$20.00 Copyright 2005 IEEE, pp. 18-27.

(Continued)

*Primary Examiner* — Tuan A Tran
(74) *Attorney, Agent, or Firm* — Vidas, Arrett & Steinkraus

(57) ABSTRACT

A wireless headset has a body, an ear clip, and at least two devices for converting at least two different sources of energy into electrical power. The body includes an RF integrated circuit in electrical communication with an antenna and a baseband circuit, the baseband circuit being in electrical communication with a microphone and a speaker. The at least two devices for converting at least two different sources of energy into electrical power are in electrical communication with the RF integrated circuit and the baseband circuit. The ear clip is engaged to the body. The at least two sources of energy are selected from the group consisting of solar energy, thermoelectric energy, piezoelectric energy, and vibration energy.

5 Claims, 5 Drawing Sheets

U.S. PATENT DOCUMENTS

2009/0061957 A1* 3/2009 Bauman ............ 455/575.2
2009/0174361 A1* 7/2009 Duron et al. ............ 320/101

OTHER PUBLICATIONS

Mary Ann Lieber, Inc.—Industrial Biotechnology—1(3):194 http://www.liebertonline.com/doi/pdf/10.1089/ind.2005.1.194.

Start-up to build motion-charged electric batteries; IT News Digest; http://blogs.techrepublic.com.com/tech-news/?p=1580, Nov. 2007.

Iqua's Sun, the solar-powered Bluetooth headset—Engadget http://www.engadget.com/2007/11/14/iquas-sun-the-solar-powered-bluetooth-headset/.

"Silicon Nanowires Turn Heat to Electricity," by Neil Savage, which may be found at www.spectrum.ieee.org/jan08/5879.

"Converter Circuit Design, Semiconductor Device Selection and Analysis of Parasitics for Micropower Electrostatic Generators," IEEE Transactions on Power Electronics, vol. 21, Issue 1, Jan. 2006 pp. 27-37.

* cited by examiner

AUTOMATIC RECHARGING WIRELESS HEADSET

CROSS-REFERENCE TO RELATED APPLICATIONS

This application is a continuation of U.S. application Ser. No. 12/033,366, entitled, "Automatic Recharging Wireless Headset," by Braden Kroll and Mark Kroll, and filed on Feb. 19, 2008, the entire contents of which is incorporated herein by reference.

STATEMENT REGARDING FEDERALLY SPONSORED RESEARCH

Not Applicable

BACKGROUND OF THE INVENTION

1. Field of the Invention

The present invention relates to a wireless headset and in particular to a wireless headset that uses alternative sources of energy to supply its power requirements.

2. Description of the Related Art

The Bluetooth earpiece is an extremely important part of a modern cellular phone. Many people utilize headsets when conversing on their mobile phone. In some states, it is illegal to drive and use a mobile telephone without utilizing a headset. This allows the user a wide range of motion without interference from wires.

A problem with current wireless headsets is that they are battery powered and must be recharged regularly. The user must transport a charging device and cannot practically use a headset while it is charging. Another problem with battery powered wireless headsets is environmental pollution due to the dangerous chemicals in the battery when the headset is ultimately disposed.

Walter in U.S. Pat. No. 5,818,946 teaches a solar charged hearing aid with a large belt clipped apparatus.

Takeuchi in U.S. Pat. No. 7,009,315 teaches a microgenerator or an apparatus for converting vibration energy into electric power. This was designed for a watch empowering in two axes and does not motivate the instant invention.

Liu in U.S. 2007/0054706 teaches a wireless headset with a vibration generator. This does not have a vibration power converter just a vibrator to alert the user when the Bluetooth is in its charger.

Li in U.S. Pat. No. 5,945,749 teaches an onboard electrical power generator operated by vibration to generate power in a train.

The art referred to and/or described above is not intended to constitute an admission that any patent, publication or other information referred to herein is "prior art" with respect to this invention. In addition, this section should not be construed to mean that a search has been made or that no other pertinent information as defined in 37 C.F.R. §1.56(a) exists.

All U.S. patents and applications and all other published documents mentioned anywhere in this application are incorporated herein by reference in their entirety.

Without limiting the scope of the invention, a brief summary of some of the claimed embodiments of the invention is set forth below. Additional details of the summarized embodiments of the invention and/or additional embodiments of the invention may be found in the Detailed Description of the Invention below.

A brief abstract of the technical disclosure in the specification is provided for the purposes of complying with 37 C.F.R. §1.72.

BRIEF SUMMARY OF THE INVENTION

In at least one embodiment, the invention is directed to a wireless headset. The wireless headset comprises a body, an ear clip, and two or more devices for converting two or more different sources of energy into electrical power. The body comprises an RF integrated circuit in electrical communication with an antenna and a baseband circuit. The baseband circuit is in electrical communication with a microphone and a speaker. The ear clip is engaged to the body. The two or more different sources of electrical power are selected from the group consisting of solar energy, thermoelectric energy, piezoelectric energy, and vibration energy. The two or more devices for converting two or more different sources of energy into electrical power are in electrical communication with the RF integrated circuit and the baseband circuit.

In at least one embodiment, the invention is directed to a wireless headset. The wireless headset comprises a body, an ear clip, three devices for converting three different sources of energy into electrical power, and at least three electrical components. The body comprises an RF integrated circuit in electrical communication with an antenna and a baseband circuit. The baseband circuit is in electrical communication with a microphone and a speaker. The ear clip is engaged to the body. The four different sources of energy are selected from the group consisting of solar energy, thermoelectric energy, piezoelectric energy, and vibration energy. Each of the three devices is in electrical communication with an input of one of the at least three electrical components. The three devices for converting three different sources of energy into electrical power are in electrical communication with the RF integrated circuit and the baseband circuit. The three or more electrical components are selected from the group consisting of a full wave rectifier and a regulator. Each of the three or more electrical components includes an output, with each output being in electrical communication with a power multiplexer. The power multiplexer is in electrical communication with an energy storage device.

These and other embodiments which characterize the invention are pointed out with particularity in the claims annexed hereto and forming a part hereof However, for further understanding of the invention, its advantages and objectives obtained by its use, reference should be made to the drawings which form a further part hereof and the accompanying descriptive matter, in which there is illustrated and described embodiments of the invention.

BRIEF DESCRIPTION OF THE SEVERAL VIEWS OF THE DRAWING(S)

A detailed description of the invention is hereafter described with specific reference being made to the drawings.

DETAILED DESCRIPTION OF THE INVENTION

Figure 1:
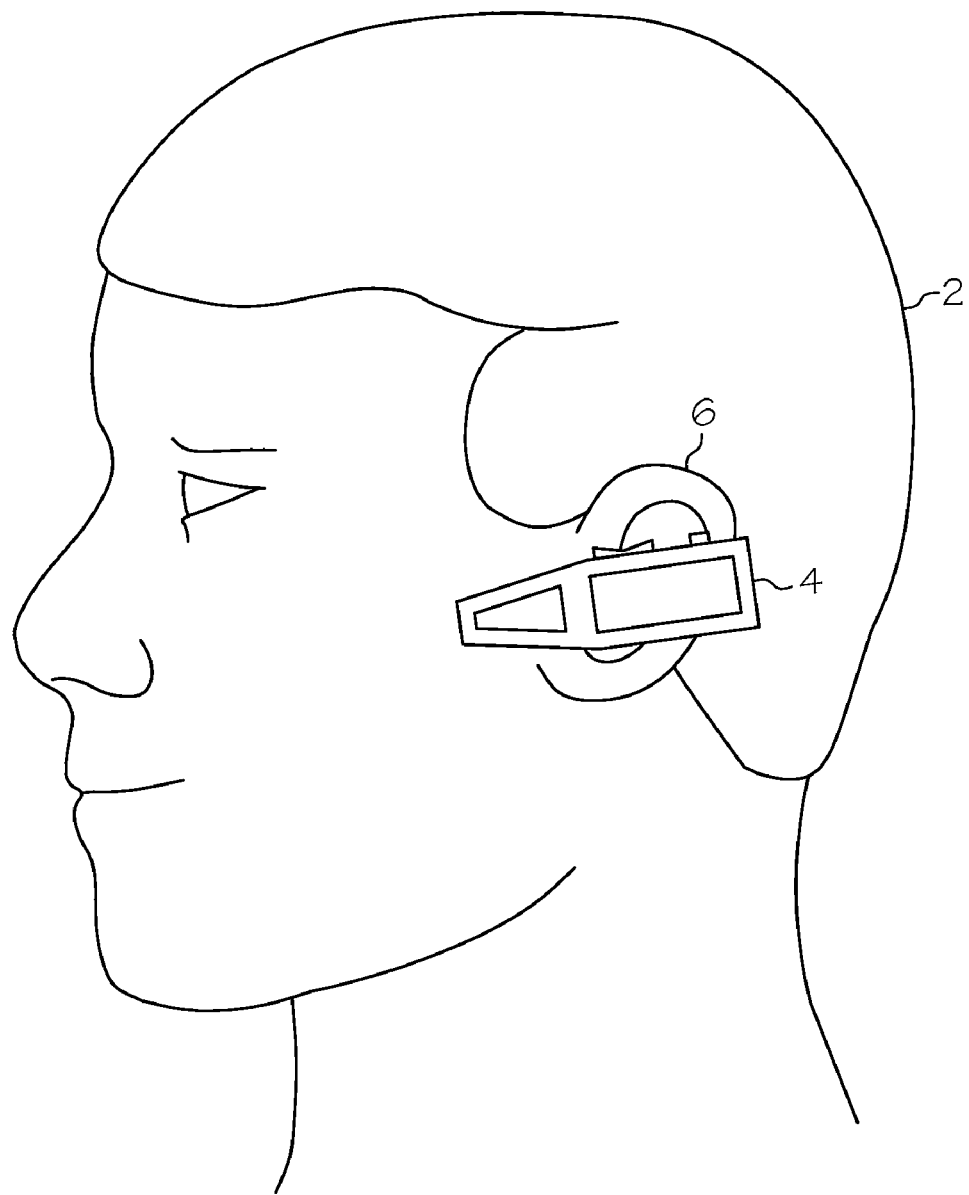
FIG. 1 is a schematic diagram illustrating an exemplary placement of a wireless headset in accordance with at least one embodiment of the present invention.

While this invention may be embodied in many different forms, there are described in detail herein specific preferred embodiments of the invention. This description is an exemplification of the principles of the invention and is not intended to limit the invention to the particular embodiments illustrated.

For the purposes of this disclosure, like reference numerals in the figures shall refer to like features unless otherwise indicated.

FIG. 1 shows a user 2 wearing an embodiment of the wireless headset 4 on the user's ear 6.

Figure 2:
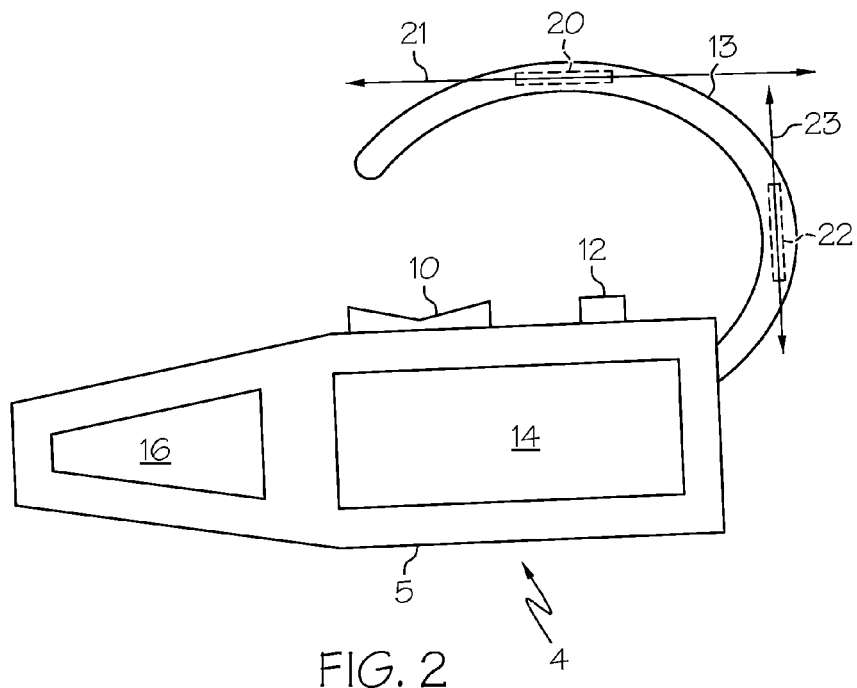
FIG. 2 is a front view illustrating an exemplary wireless headset with solar panels and external controls in accordance with at least one embodiment of the present invention.

Referring now to FIG. 2, an exemplary wireless headset 4 with body 5 is illustrated in accordance with at least one embodiment of the present invention. The wireless headset 4 is shown with a volume control 10 and an on/off switch 12 on the top of the body 5. Ear clip 13, for attaching the headset to the user's ear, is depicted in an extended position. Ear clip 13 is engaged to the body 5.

In at least one embodiment, the wireless headset comprises two or more devices for converting two or more different sources of energy into electrical power. The two or more different sources of electrical power include solar energy, thermoelectric energy, piezoelectric energy, and vibration energy.

In some embodiments of the invention, one of the two or more devices for converting energy is one or more solar cells. FIG. 2 depicts such a device, namely a main solar cell 14. FIG. 2 also depicts the wireless headset 4 with a second solar cell, a forward solar cell 16. One of ordinary skill will recognize that other embodiments of the present invention may include more than two solar cells, or differently configured solar cells, such as a main solar cell and a rear solar cell (as opposed to a forward solar cell).

Figure 3:
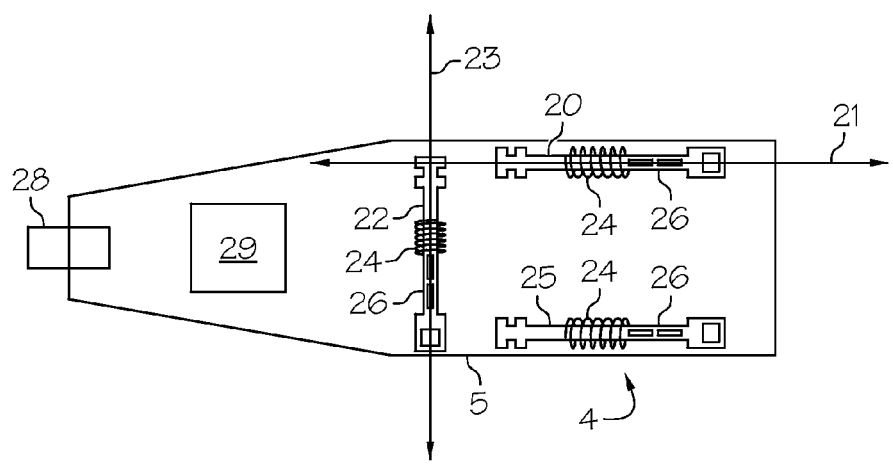
FIG. 3 is a cut-away view illustrating an exemplary wireless headset with both vertical and horizontal movement sensing power generators in accordance with at least one embodiment of the present invention.

FIG. 3 depicts an embodiment of the wireless headset 4 with another of the two or more devices for converting energy into electrical power. The microgenerators 20, 22 shown in FIG. 3 convert vibration energy from movement of the user's body into electrical energy. In FIG. 3, both a horizontal movement sensing electromagnetic microgenerator 20 and a vertical movement sensing electromagnetic microgenerator 22 are illustrated. Microgenerator 20 is oriented on a horizontal axis 21 and microgenerator 22 is oriented on a vertical axis 23, thereby allowing the headset to capture vibration energy from two axes of motion.

In some embodiments of the present invention, the microgenerators 20, 22 are designed to operate at low "g" vibration levels, such as between 0 g and 0.1 g of vibration. In at least one embodiment, a third microgenerator 25 is present, such as depicted in FIG. 3. Although microgenerator 25 is shown oriented horizontally on an axis (not shown) like microgenerator 20, it may also be oriented vertically like microgenerator 22. The microgenerator 25 is a high "g" generator such that when 1 g-10 g of vibration is present, higher levels of power are produced in comparison with a low "g" microgenerator. In embodiments that include microgenerator 25, a user may recharge a discharged headset by shaking the headset. It should be noted that the wireless headset may be designed with only a single microgenerator, depending on the power requirements of the headset and the power capabilities of the microgenerator.

In at least one embodiment, the microgenerators 20, 22, and 25 comprise a coil 24 and a moving magnet 26. While FIG. 3 depicts the microgenerators 20, 22, and 25 housed within the body 5 of the headset, one or both microgenerators may instead be contained within the ear clip 13, as shown in FIG. 2. Or, in some embodiments, the microgenerators may be placed in both the body 5 of the headset as well as in the ear clip 13.

Other embodiments of microgenerators may also be used with embodiments of the present invention. For example, a microelectromechanical systems generator available from Ferro Solutions, Inc. at 215 First Street, Cambridge, Mass. 02142 (www.ferrosi.com), such as described in U.S. Pat. No. 6,984,902, the entire contents of which being expressly incorporated herein by reference, may be used. Also, a microgenerator available from Perpetuum, LTD at Epsilon House, Southampton Science Park, Southampton, SO16 7NS, United Kingdom (www.perpetuum.co.uk), such as described in U.S. Patent Application Publication Nos. 20070194634 and 20070210580, the entire contents of each being expressly incorporated herein by reference, may be used. In addition, a nonresonant or tunable microgenerator such as the one of developed by Peng Miao of Imperial College, London, UK may be utilized. More information regarding the Peng Miao device may be found in "Converter Circuit Design, Semiconductor Device Selection And Analysis Of Parasitics For Micropower Electrostatic Generators," IEEE Transactions on Power Electronics, Volume 21, Issue 1, January 2006 Page(s): 27-37, the entire content of which is incorporated herein by reference.

In some embodiments of the present invention, the headset 4 includes a male mini-USB jack 28, as shown in FIG. 3. Including jack 28 allows the headset 4 to be charged directly from the cell phone. In at least one embodiment, the jack 28 is a female mini-USB jack, used in conjunction with an adaptor cable, to connect the headset directly to the cell phone. In some embodiments, the headset may be recharged by applying wall power to the jack 28 via a cable and power supply. While the jack 28 is described above to be a mini-USB jack, the jack 28 is not intended to be limited to a specific type of jack, but rather is directed toward the general concept of connecting the headset directly to the cell phone to allow recharging the headset via the cell phone battery. One of ordinary skill in the art will appreciate that any number of connectors may be used for such a purpose.

Still referring to FIG. 3, wireless headset 4 is depicted with another device for converting energy into electrical power, specifically piezoelectric energy. The headset includes a piezoelectric transducer 29. In at least one embodiment, the piezoelectric transducer 29 comprises polyvinylidene difluoride (PVDF). PVDF exhibits piezoelectricity, a characteristic that allows a material to generate electric potential upon application of a mechanical force. Therefore, in embodiments comprising PVDF, a user may recharge the headset through application of repetitive pressure to the PVDF material, such as by squeezing between a finger and thumb. One of ordinary skill will recognize that the PVDF transducer 29 may be incorporated into the headset at a number of locations in order to prevent interference by or damage to the solar cells 14, 16.

In some embodiments of the present invention, the piezoelectric transducer may include a piezoelectric ceramic material such as lead-zirconia-titania (PZT) combined with a metal conductor to create a PZT bimorph, such as the device developed by EoPlex Technologies (www.eoplex.com).

Figure 4:
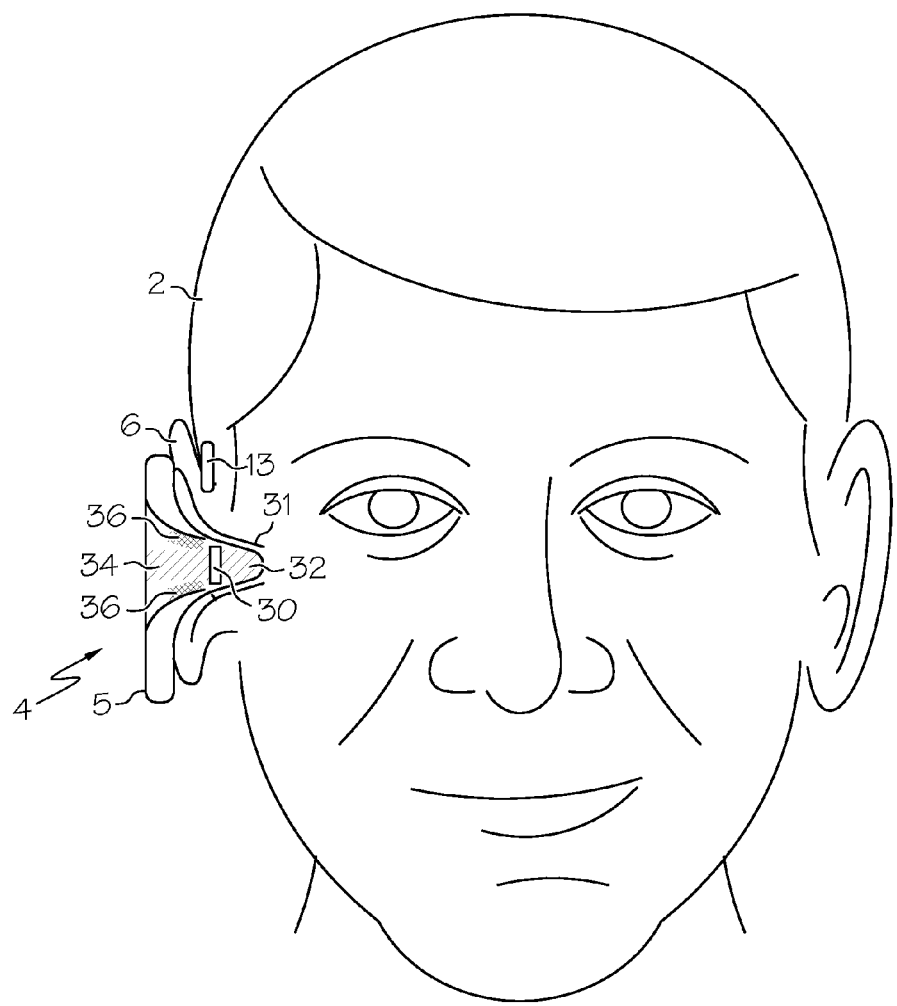
FIG. 4 is a schematic diagram illustrating an exemplary placement of a wireless headset with a thermoelectric device in accordance with at least one embodiment of the present invention.

Referring now to FIG. 4, another embodiment of the wireless headset 4 is illustrated. The embodiment in FIG. 4 shows another of the two or more devices for converting energy into electrical power, namely thermoelectric device 30. The thermoelectric device is designed to convert temperature differentials into electrical power. The electrical power generating property of a thermoelectric device is due to the Seebeck effect. As defined by www.dictionary.com, the Seebeck effect is "the creation of an electrical potential across points in a metal that are at different temperatures."

Still referring to FIG. 4, the wireless headset 4 is placed on the ear of the user with ear clip 13, like before. In at least one embodiment, a thermoelectric device 30, positioned close to or within the ear canal 31, is connected thermally to the user's body through conductive material 32. In some embodiments, the conductive material 32 is a high density conductive polymer. The thermoelectric device 30 is electrically engaged to the circuitry in the wireless headset 4, as described below.

The outer side of the thermoelectric device 30 is connected through the thermally conductive material 34 to the solar cell(s) on the outside of the wireless headset in order to sense the ambient temperature. Insulating material 36 surrounds the conductive material 34 to maintain the outside of the thermoelectric device at a temperature close to ambient.

One example of a suitable thermoelectric device 30 is the Low Power Thermoelectric Generator manufactured by the DTS Company of Halle, Germany (www.dts-generator.com/main-e.htm). It has a volume of approximately 0.2 cm$^3$. With a typical inner ear temperature of about 37 degrees Celsius and an ambient temperature of about 25 Celsius, there is a thermal gradient of approximately 12 degrees Celsius. A thermal gradient of approximately 12 degrees Celsius allows a thermoelectric device to generate approximately 10 microwatts of power. This amount of power is sufficient to maintain the sleep mode of a typical Bluetooth integrated circuit, such as the Toshiba TB31296FT which draws about 0.1 microwatts in sleep mode.

At least one embodiment of a suitable thermoelectric device comprises silicon nanowires. Information regarding silicon nanowires and thermoelectric devices may be found in the article entitled "Silicon Nanowires Turn Heat to Electricity," by Neil Savage, which may be found at www.spectrum.ieee.org/jan08/5879, the entire contents of which are incorporated herein by reference.

In at least one embodiment, the thermoelectric device 30 in FIG. 4 may be incorporated into the ear clip instead of, or in addition to, the thermoelectric device placed within the ear canal. Such an embodiment takes advantage of the thermal contact that naturally takes place between the ear clip and the skin behind the ear. The ear clip may be designed with a surface area greater than a typical wireless headset ear clip in order to accommodate more, or incorporate larger, thermoelectric devices.

Figure 5:
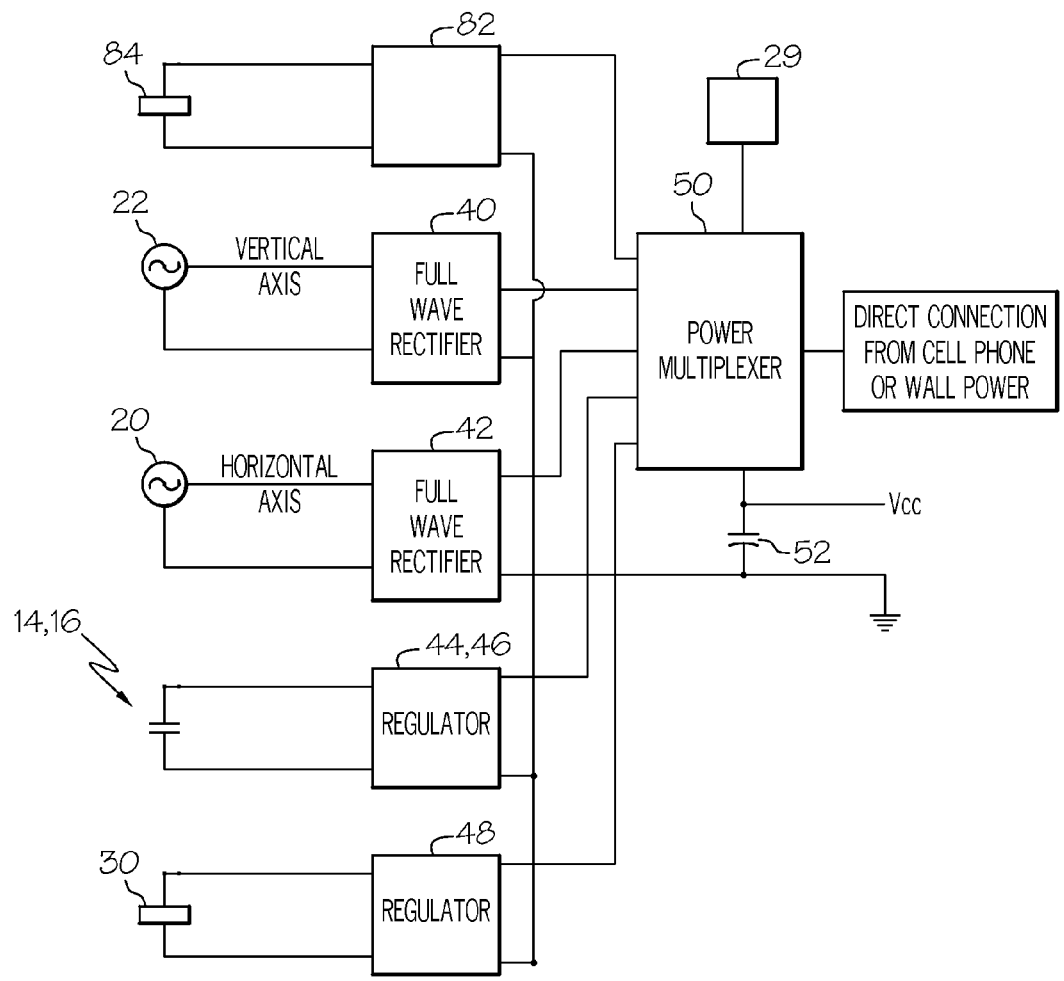
FIG. 5 is a schematic diagram illustrating an exemplary circuit for the power handling of a wireless headset in accordance with at least one embodiment of the present invention.

Referring now to FIG. 5, a simplified schematic of an embodiment of the power handling circuitry contained within the body of the wireless headset is illustrated. As seen in FIG. 5, the microgenerators (20, 22) are in electrical communication with the input of the full wave rectifiers (40, 42), while the solar cells (14, 16) and the thermoelectric device 30 are in electrical communication with the input of the regulators (44, 46, 48).

Still referring to FIG. 5, the electrical power generated from the vertical axis microgenerator 22 is captured by a solid state full wave rectifier 40. A solid state full wave rectifier is well known in the art and involves electronic controls of field effect transistors to eliminate the diode drop of a conventional rectifier. Similarly, the horizontal axis microgenerator 20 feeds its electrical power into a second solid state full wave rectifier 42. The two solar cells (14, 16) feed their output into the current regulators (44, 46). The current regulators draw the optimal load on the solar cells to deliver the maximum power depending on the ambient light available. For example, during bright daylight hours they would be able to draw more power than in the evening when there would be almost no power drawn.

The thermoelectric device 30 feeds its electrical power into regulator 48. The internal impedance of the thermoelectric device is quite high, on the order of one meg-ohm. Depending upon the temperature differential sensed, the regulator 48 gives an optimally matched impedance to draw the maximum power from thermoelectric device 30. The outputs of the full wave rectifiers and regulators are then fed into a power multiplexer 50. Solid state circuitry then converts the input voltage levels to an optimal voltage level to charge the energy storage element 52. The energy storage element 52 provides the supply voltage $V_{CC}$ and power output to the electronic circuitry. The energy storage device may be a rechargeable battery, such as those made from lithium-ion cells, nickel metal hydride cells, or a nickel-cadmium cells. The energy storage device may also be a supercapacitor. Supercapacitors, also known as ultracapacitors, are known by those skilled in the art. Supercapacitors have much higher energy density than ordinary capacitors, due at least in part to their double layer design. An example supercapacitor is described in U.S. Pat. No. 6,762,926, the entire content of which is incorporated herein by reference.

Still referring to FIG. 5, in embodiments using piezoelectric energy, the PVDF transducer 29 output is fed into the power multiplexer 50. In embodiments of the present invention that connect directly to either a cell phone or to wall power, the cell phone power or wall power is input the power multiplexer 50.

At least one embodiment of the present invention includes a circuit 82 to harvest S-band microwave energy 84. The circuit 82 takes microwave energy 84 and converts it into a DC current. The use of such a circuit allows a headset to be recharged quickly by placing the headset in a microwave oven, a source of S-band radiation. The output is fed into the power multiplexer 50. An example of such a circuit is described in U.S. Pat. No. 5,994,871, the entire contents of which being expressly incorporated herein by reference.

It should be noted that the power handling circuitry of the wireless headset is not limited to what is shown in the simplified schematic of FIG. 5. Rather, one of ordinary skill will recognize that a number of additional electrical components may be desirable to improve performance.

Figure 6:
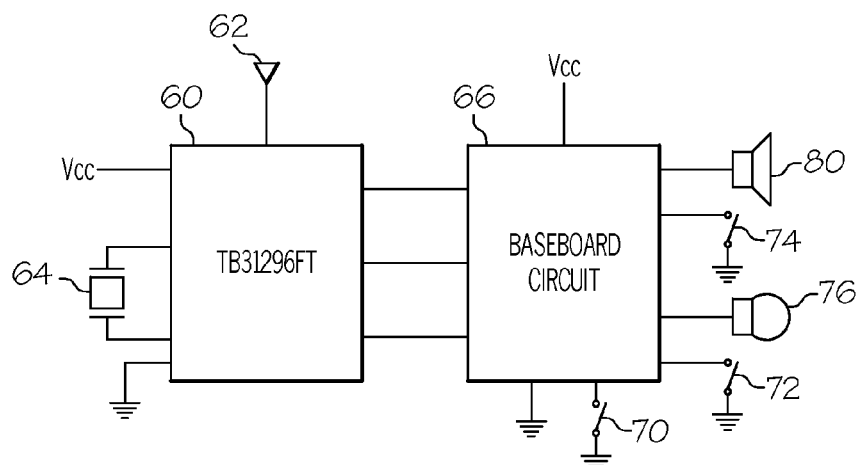
FIG. 6 is a schematic diagram illustrating an exemplary circuit for the implementation of Bluetooth circuitry used to enable the wireless headset in accordance with at least one embodiment of the present invention.

Referring now to FIG. 6, a simplified exemplary implementation of the Bluetooth circuitry used to enable the wireless headset is illustrated in accordance with at least one embodiment of the present invention. The single chip Bluetooth RF integrated circuit, such as the Toshiba TB31296FT, is shown as element 60. The Bluetooth RF integrated circuit is connected to antenna 62, crystal 64, and to baseband circuit 66. The baseband circuit 66 reads the status of the power-on switch 70 which is operated by the on/off switch 12 of FIG. 2. The baseband circuit 66 also reads the status of volume-up switch 72 and volume-down switch 74, both of which are operated by the volume control 10 of FIG. 2. In addition, the baseband circuit 66 takes a signal from microphone 76 and outputs an audio signal to speaker 80.

Although FIG. 6 specifically depicts using Bluetooth circuitry, embodiments of the present invention are also directed towards the more general concept of providing power to a wireless headset used for RF communications, independent of a particular communications protocol.

Figure 7:
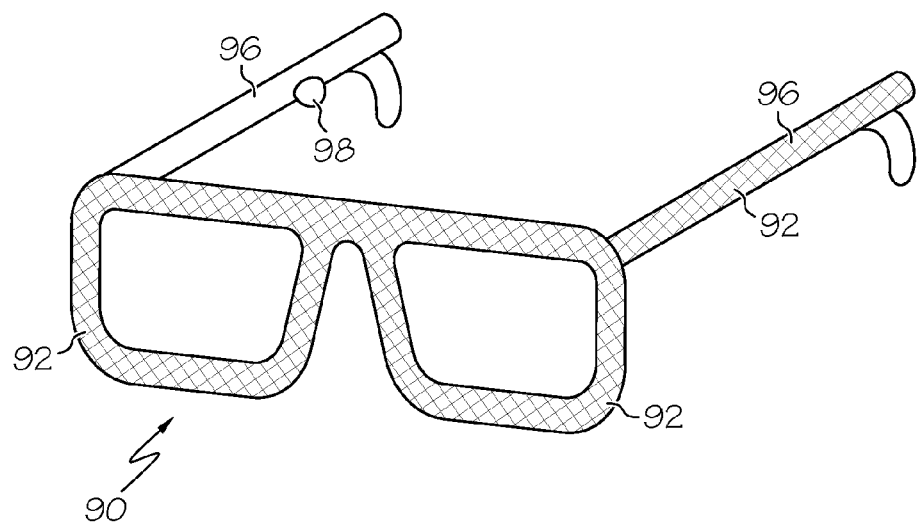
FIG. 7 is a perspective view illustrating an exemplary wireless headset in the form of a pair of sunglasses with solar cells in accordance with at least one embodiment of the present invention.

Referring now to FIG. 7, another embodiment of the present invention is depicted. FIG. 7 depicts sunglasses 90 with solar cells 92 on the frame 94 and temple bows 96. The solar cells 92 provide power to the wireless circuitry that is embedded within the sunglasses 90. A thin-film optical layer covers the solar cells 92 for cosmetic effect while allowing transmission of optimal light wavelengths for solar efficiency. Also included in the sunglasses 90 of FIG. 7 is a built-in ear-piece 98. Although not specifically depicted, at least one embodiment of the sunglasses 90 of FIG. 7 includes at least one thermoelectric device 30 as described in detail above. And, although not specifically depicted, some embodiments of the sunglasses 90 of FIG. 7 include at least one microgenerator as described in detail above.

Figure 8:
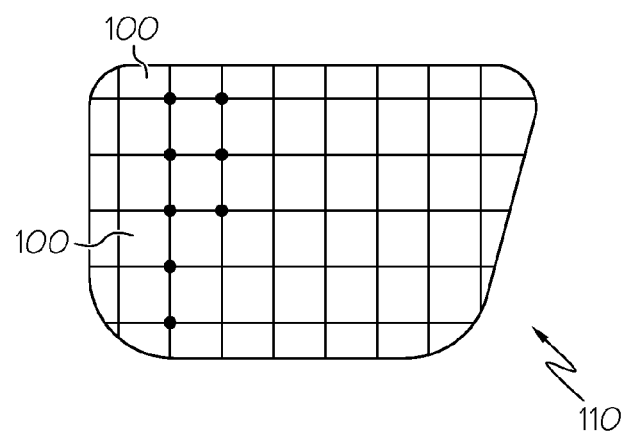
FIG. 8 is a schematic diagram illustrating an exemplary lens with solar cells for use with the sunglasses depicted in FIG. 7.

FIG. 8 depicts lens for use with the sunglass 90 of FIG. 7. FIG. 8 depicts a microscopic grid of solar cells 100 embedded in the lens 110. Each cell is less than 0.2 mm by 0.2 mm, which prevents obstruction of vision. The solar cells 100 have a coverage of about 10-50% of the lens. Some embodiments of the invention include the use of nanowire solar cells, such as described in U.S. Pat. No. 7,265,037, the entire contents of which being expressly incorporated herein by reference.

The above disclosure is intended to be illustrative and not exhaustive. This description will suggest many variations and alternatives to one of ordinary skill in this art. The various elements shown in the individual figures and described above may be combined or modified for combination as desired. All these alternatives and variations are intended to be included within the scope of the claims where the term "comprising" means "including, but not limited to".

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

The invention claimed is:

1. A wireless headset comprising:
a body comprising a radiofrequency (RF) integrated circuit in electrical communication with an antenna and a baseband circuit, the baseband circuit in electrical communication with a microphone and a speaker;
an ear clip engaged to the body;
a first adapter configured to engage a second adapter of a cellular phone and receive power from the cellular phone;
a plurality of devices for converting at least two different sources of energy into electrical power, the plurality of devices being in electrical communication with the RF integrated circuit and the baseband circuit,
wherein the at least two different sources of energy are selected from the group consisting of solar energy, thermoelectric energy, piezoelectric energy, and vibration energy,
wherein a first one and a second one of the plurality of devices comprises a first microgenerator and a second microgenerator, the first microgenerator and the second microgenerator configured to convert vibration energy,
wherein the first microgenerator is oriented on a vertical axis and the second microgenerator oriented on a horizontal axis.

2. A wireless headset comprising:
a body comprising a radiofrequency (RF) integrated circuit in electrical communication with an antenna and a baseband circuit, the baseband circuit in electrical communication with a microphone and a speaker;
an ear clip engaged to the body;
a first adapter configured to engage a second adapter of a cellular phone and receive power from the cellular phone;
a plurality of devices for converting at least two different sources of energy into electrical power, the plurality of devices being in electrical communication with the RF integrated circuit and the baseband circuit,
wherein the at least two different sources of energy are selected from the group consisting of solar energy, thermoelectric energy, piezoelectric energy, and vibration energy,
wherein a first one and a second one of the plurality of devices comprises a first microgenerator and a second microgenerator, the first microgenerator and the second microgenerator configured to convert vibration energy,
wherein the ear clip comprises at least one of the first microgenerator and the second microgenerator.

3. A wireless headset comprising:
a body comprising a radiofrequency (RF) integrated circuit in electrical communication with an antenna and a baseband circuit, the baseband circuit in electrical communication with a microphone and a speaker;
an ear clip engaged to the body;
a first adapter configured to engage a second adapter of a cellular phone and receive power from the cellular phone; and
a plurality of devices for converting at least two different sources of energy into electrical power, the plurality of devices being in electrical communication with the RF integrated circuit and the baseband circuit,
wherein the at least two different sources of energy are selected from the group consisting of solar energy, thermoelectric energy, piezoelectric energy, and vibration energy, wherein one of the plurality of devices comprises at least one thermoelectric generator configured to convert temperature differences into electrical power, wherein a thermally conductive material engaged to the at least one thermoelectric generator is configured to fit within a user's ear canal.

4. A pair of sunglasses comprising:

a frame comprising a radiofrequency (RF) integrated circuit in electrical communication with an antenna and a baseband circuit, the baseband circuit in electrical communication with a microphone;

an ear-piece engaged to the frame; and a plurality of devices for converting at least two different sources of energy into electrical power, the plurality of devices being in electrical communication with the RF integrated circuit and the baseband circuit, wherein the at least two different sources of energy are selected from the group consisting of solar energy, thermoelectric energy, and vibration energy, wherein one of the plurality of devices comprises at least one thermoelectric generator configured to convert temperature differences into electrical power, wherein a thermally conductive material is engaged to the at least one thermoelectric generator, wherein the thermally conductive material is further engaged to the ear-piece.

5. A pair of sunglasses comprising:

a frame comprising a radiofrequency (RF) integrated circuit in electrical communication with an antenna and a baseband circuit, the baseband circuit in electrical communication with a microphone;

an ear-piece engaged to the frame;

a plurality of devices for converting at least two different sources of energy into electrical power, the plurality of devices being in electrical communication with the RF integrated circuit and the baseband circuit, wherein the at least two different sources of energy are selected from the group consisting of solar energy, thermoelectric energy, and vibration energy, wherein one of the plurality of devices comprises at least one solar cell configured to convert solar energy to electrical power; and a first lens and a second lens, wherein at least one of the first lens and the second lens comprise the at least one solar cell.

\* \* \* \* \*